US007065163B2

(12) United States Patent
Rick et al.

(10) Patent No.: US 7,065,163 B2
(45) Date of Patent: Jun. 20, 2006

(54) FREQUENCY ERROR ESTIMATION USING MULTIPLE INTEGRATION LENGTHS

(75) Inventors: Roland R. Rick, San Diego, CA (US); Arunava Chaudhuri, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 442 days.

(21) Appl. No.: 10/682,260

(22) Filed: Oct. 8, 2003

(65) Prior Publication Data

US 2005/0078774 A1    Apr. 14, 2005

(51) Int. Cl.
*H04L 27/06* (2006.01)
*H04B 1/18* (2006.01)

(52) U.S. Cl. .................... 375/344; 455/192.2
(58) Field of Classification Search ............. 375/344, 375/316; 455/182.2, 192.2, 255, 256, 264, 455/265; 332/126; 329/306
See application file for complete search history.

(56) References Cited

U.S. PATENT DOCUMENTS 4,921,467 A * 5/1990 Lax ............................ 455/264
5,172,075 A * 12/1992 Yerbury et al. ............. 331/14
6,233,292 B1   5/2001 Van Bezooijen et al. ... 375/344

FOREIGN PATENT DOCUMENTS

WO          02067520        8/2002

* cited by examiner

Primary Examiner—Khai Tran
(74) Attorney, Agent, or Firm—Philip Wadsworth; Charles D. Brown; Howard H. Seo (57) ABSTRACT

A wireless communication device (WCD) estimates frequency error by averaging frequency error estimates over multiple integration lengths to generate short-term and long-term averages. The WCD compares the short-term and long-term averages with short-term and long-term thresholds. The long-term thresholds are lower than the short-term threshold. If the average for any integration length exceeds its respective threshold, a frequency offset is determined and an oscillator frequency is adjusted based on that frequency offset. The use of both short-term and long-term thresholds facilitates responding quickly to relatively large changes in the frequency error, while ignoring smaller changes that may be indicative of noise in the system rather than actual changes in the frequency error.

35 Claims, 5 Drawing Sheets

FREQUENCY ERROR ESTIMATION USING MULTIPLE INTEGRATION LENGTHS

TECHNICAL FIELD

The present disclosure relates generally to wireless communications. More particularly, the present disclosure relates automatic frequency control (AFC) for use in wireless communication devices.

BACKGROUND

In wireless communication systems, a plurality of wireless communication devices (WCDs) communicate with one or more base stations within areas known as cells. A wireless communication system can include a variety of types of WCDs, including, for example, wireless telephones and devices having wireless communication capabilities, such as personal digital assistants (PDAs) and modems for use with laptop computers. Wireless communication functions can also be incorporated into other types of devices, such as automobiles. With wireless capabilities incorporated into an automobile design, a driver can obtain real-time, location-based traffic, weather, and navigation information, as well as roadside assistance and vehicle condition alerts.

Within each cell, several WCDs may communicate with a base station simultaneously using a single frequency band. Sharing of the frequency band can be accomplished using any of a variety of multiple access techniques. One technology that has enjoyed rapid growth is code division multiple access (CDMA). In CDMA systems, speech or data is converted to a digital form, which is then transmitted as a radio signal. Each call is distinguished by a unique code. In particular, each WCD uses a unique spreading code to modulate the signals it transmits and to demodulate the signals it receives. This code is added to the information data, e.g., the voice data, and modulated onto the carrier. An identical code is used in the receiver that is used to correlate the code with the carrier. The correlation process passes only data that matches the code. Thus, non-valid signals, e.g., signals from other users, are not decoded and appear as noise. As a result, minimal interference between WCDs is achieved. Accordingly, several WCDs can share a single frequency band. Further information regarding CDMA systems is set forth in the well-known IS-95 standard.

Some other wireless communication systems use other multiple access technologies, including, for example, frequency division multiple access (FDMA), amplitude companded single sideband (ACSSB) and other amplitude modulation (AM) schemes. Another technology that has come into widespread use is time division multiple access (TDMA), in which WCDs communicate during allocated time slots.

One multiple access technology related to TDMA is known as Global System for Mobile (GSM), which uses TDMA in combination with encryption techniques. GSM communications are structured using a number of channels, including, for example, a traffic channel (TCH) for transferring information. In addition, the GSM standard uses a common control channel (CCCH) for transferring control information, such as WCD registration, paging, and call origination and termination. The CCCH itself includes several channels associated with specific types of control information. These channels include the random access control channel (RACH), the paging and access grant channel (PAGCH), the broadcast control channel (BCCH), the synchronization channel (SCH), and the frequency correction channel (FCCH). The FCCH and SCH, for example, are used in maintaining synchronization between WCDs and respective base stations.

GSM channels are communicated using any of a number of frequencies within an allocated band of frequencies, for example, 880–960 MHz. In addition, DCS channels can be communicated using a different band of frequencies, including, but not limited to, the 1710–1880 MHz band. The WCD generates these frequencies using a clock arrangement. The clock arrangement may incorporate an oscillator, such as a voltage-controlled crystal oscillator (VCXO) or a voltage-controlled, temperature-compensated crystal oscillator (VCTCXO). In some implementations, the oscillator is controlled by a pulse density modulator (PDM). Among other operational aspects, the PDM controls the frequency generated by the oscillator. In order for the WCD to communicate with its associated base station, it is desirable that the oscillator generate a frequency that matches the frequency on which the base station is communicating.

To ensure that the WCD and base station frequencies match, the clock arrangement in the WCD may use automatic frequency control (AFC) techniques to track the frequency used by the base station and match that frequency. AFC techniques generally involve estimating a frequency error between the WCD and base station frequencies, i.e., the difference between the WCD frequency and the base station frequency. The estimated frequency error is used to determine a frequency offset to be applied to the oscillator to compensate for the estimated frequency error. The PDM then applies the frequency offset to the oscillator, for example, by applying an input voltage to the oscillator, which alters the oscillator frequency in response to the applied voltage.

The WCD can implement AFC using any of a number of techniques. One conventional AFC technique involves the use of an infinite impulse response (IIR) filter to estimate the frequency error. The IIR compares a long-term frequency error estimate with an instantaneous frequency error estimate for an individual sample to determine the difference between the long-term and instantaneous frequency error estimates. The IIR adjusts the long-term frequency error estimate as a function of this difference, typically by multiplying the difference by a scale factor and using the resulting product to adjust the long-term frequency error estimate. Using a large scale factor enables the IIR to respond relatively quickly to changes in the frequency error, but also renders the WCD susceptible to noise, e.g., variations in the instantaneous frequency error estimate from one sample to the next. Such variations may or may not be caused by a change in the actual frequency error. Alternatively, the IIR can use a small scale factor to reduce susceptibility to noise. Using a small scale factor, however, increases the response time of the IIR to changes in the actual frequency error.

Another conventional AFC technique involves averaging frequency error estimates over a predetermined number of samples, or integration length, to determine an average frequency error estimate. If the integration length is small, the WCD can respond quickly to changes in the frequency error. With a small integration length, however, the AFC technique is susceptible to noise. Using a large integration length reduces the susceptibility of the AFC technique to noise. As a result, the steady state response to a change in the frequency error is more stable relative to smaller integration lengths. However, the WCD responds to changes in the frequency error more slowly relative to smaller integration lengths.

SUMMARY

According to various embodiments, a wireless communication device (WCD) estimates frequency error by determining an average frequency error estimate over multiple integration lengths. Averages of frequency error estimates are calculated over at least two integration lengths. These averages are compared with multiple thresholds. If the average for any integration length exceeds its respective threshold, a frequency offset is determined.

One embodiment is directed to a method to determine a frequency offset to be applied in a wireless communication device. Short-term and long-term average values are determined by averaging first and second sets, respectively, of frequency error estimates, the second set comprising a superset of the first set of frequency error estimates. The frequency offset is determined as a function of the short-term average value when the short-term average value exceeds a short-term threshold value and is determined as a function of the long-term average value when the long-term average value exceeds a long-term threshold value lower than the short-term threshold value.

In another embodiment, an oscillator is configured for use in connection with a wireless communication device by reading a frequency offset value from a memory associated with the oscillator. Short-term and long-term average values are determined by averaging first and second sets, respectively, of frequency error estimates, the second set comprising a superset of the first set of frequency error estimates. An oscillator frequency is adjusted as a function of the short-term average value when the short-term average value exceeds a short-term threshold value and is adjusted as a function of the long-term average value when the long-term average value exceeds a long-term threshold value lower than the short-term threshold value. Either of these methods can be implemented using processor-executable instructions contained in a processor-readable medium.

In still another embodiment, an integrated circuit (IC) includes an oscillator and a processor arrangement operatively coupled to the oscillator. The processor arrangement is configured to average a first set of frequency error estimates to determine a short-term average value and a second set of frequency error estimates to determine a long-term average value. The second set is a superset of the first set of frequency error estimates. The processor arrangement adjusts a frequency of the oscillator as a function of the short-term average value when the short-term average value exceeds a short-term threshold value. The processor arrangement adjusts the frequency of the oscillator as a function of the long-term average value when the long-term average value exceeds a long-term threshold value, which is lower than the short-term threshold value.

In yet another embodiment, a wireless communication device (WCD) includes an antenna arranged to receive an RF signal. A receive arrangement is operatively coupled to the antenna and generates a plurality of samples as a function of the RF signal. An oscillator is operatively coupled to the receive arrangement and configured to generate a frequency. A processor arrangement is coupled to receive the plurality of samples from the receive arrangement. The processor arrangement is configured to calculate a plurality of frequency error estimates as a function of the samples. The processor arrangement averages a first subset of the frequency error estimates to determine a short-term average value and a second subset of the frequency error estimates to determine a long-term average value. The second subset is a superset of the first subset of frequency error estimates. The processor arrangement adjusts the frequency generated by the oscillator as a function of the short-term average value when the short-term average value exceeds a short-term threshold value. The processor arrangement adjusts the frequency generated by the oscillator as a function of the long-term average value when the long-term average value exceeds a long-term threshold value lower than the short-term threshold value.

BRIEF DESCRIPTION OF THE DRAWINGS

The present invention will now be described, by way of example, with reference to the accompanying drawings, in which.

DESCRIPTION

According to various embodiments, a wireless communication device (WCD) estimates frequency error by averaging frequency error estimates over multiple integration lengths to generate multiple average values, such as a short-term average value and a long-term average value. The WCD compares the short-term and long-term average values with short-term and long-term thresholds. The long-term threshold is lower than the short-term threshold because smaller changes in the frequency error are significant when they appear over a larger set of samples. In some embodiments, the WCD may use a greater number of average values, each associated with a corresponding threshold. If the average for any integration length exceeds its respective threshold, a frequency offset is determined and an oscillator frequency is adjusted based on that frequency offset. In some embodiments, any change in the frequency error may be significant if it appears over a still larger set of samples, and the WCD adjusts the oscillator frequency by a frequency offset determined relative to this still larger set of samples.

Calculating short-term average values and comparing them with a short-term threshold allows the WCD to respond quickly to relatively large changes in the frequency error, while ignoring smaller changes that may be indicative of noise in the system rather than actual changes in the frequency error. In addition, calculating long-term average values and comparing them with a long-term threshold lower than the short-term threshold facilitates responding to smaller changes in the frequency error. Requiring smaller changes to persist over a larger set of samples provides some protection against noise in the system, i.e., variations in the instantaneous frequency error estimate between successive samples that may not be representative of actual changes in the frequency error.

Figure 1:
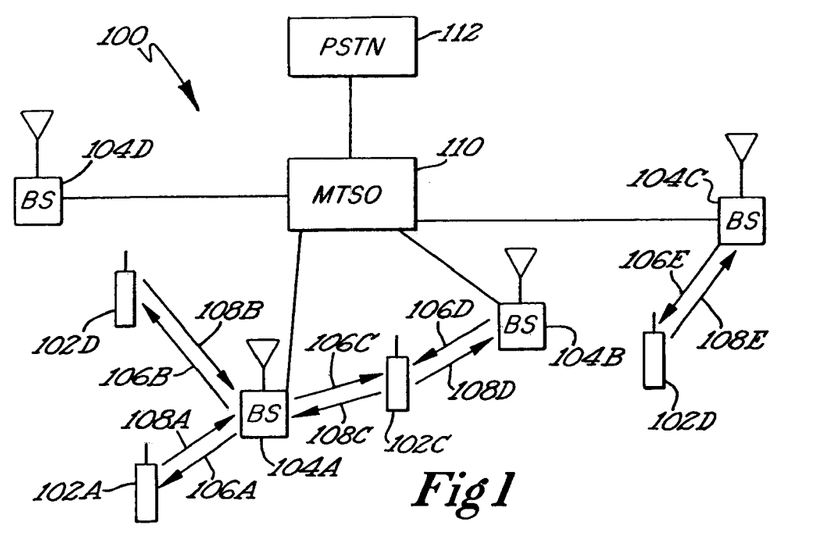
FIG. 1 is a system diagram illustrating an example wireless communication system according to an embodiment.

FIG. 1 is a system diagram illustrating an example wireless communication system 100 according to an embodiment. In particular, the wireless communication system 100 is depicted as a wireless telephone network. However, it will be appreciated by those skilled in the art that the principles disclosed herein are equally applicable to wireless communication systems in which one or more devices within the system use automatic frequency control (AFC) to track a frequency of another component of the system, such as a base station. The wireless telephone network shown in FIG. 1 may be configured for use in GSM communications, for example, in the frequency band of 880-960 MHz. In addition, the wireless telephone network may be configured for use in DCS communications in the frequency band of 1710–1880 MHz or other frequency bands. The wireless communication system 100 may also be configured for use in GPRS communications and/or CDMA communications according to any of a number of standards, including, for example, the IS-95 standard, the CDMA2000 standard, and the WCDMA standard.

During operation, wireless communication devices (WCDs) 102A-D conduct wireless communication by establishing one or more RF interfaces with one or more base stations 104A-D using modulated RF signals. WCDs 102A-D are depicted in FIG. 1 as wireless telephones communicating using the GSM standard. Those skilled in the art will understand that any or all of WCDs 102A-D may be implemented as wireless telephones that use other protocols, such as CDMA protocols. Further, any or all of WCDs 102A-D may be implemented as other types of WCDs, including, for example, personal digital assistants (PDAs) with wireless capabilities and wireless modems for use with laptop computers. Wireless communication functions can also be incorporated into other types of devices, such as automobiles.

Each RF interface between a base station 104 and a WCD 102 includes a forward link 106, or downlink, from the base station 104 to the WCD 102 and a reverse link 108, or uplink, from the WCD 102 to the base station 104. Using these RF interfaces, a call with another user may be conducted via a mobile telephone switching office (MTSO) 110 and a public switch telephone network (PSTN) 112. The links between the base stations 104, the MTSO 110, and the PSTN 112 may be formed via either wired connections or wireless connections, such as microwave links.

As described above, each WCD 102 receives an RF signal from one or more base stations 104 via a forward link 106. This RF signal is relatively low in power. Accordingly, an LNA forming part of the WCD 102 amplifies the received RF signal so that the WCD 102 can downconvert the received RF signal to baseband signals, e.g., in-phase (I) and quadrature (Q) baseband signals. The baseband signals are then demodulated by a modem to extract the voice or data signal carried by the RF signal.

Each base station 104 typically broadcasts a signal to its associated WCDs 102 on the frequency correction channel (FCCH). The WCD 102 uses the FCCH to tune to an appropriate frequency for communicating with the base station 104. More particularly, a receive subsystem in the WCD 102 configures a frequency tuner to tune an oscillator, such as a voltage-controlled crystal oscillator (VCXO) or a voltage-controlled, temperature-compensated crystal oscillator (VCTCXO) according to coarse frequency estimation based on the FCCH.

Upon activation of the WCD 102, the initial frequency of the oscillator may exhibit error, e.g., discrepancy with respect to the base station frequency as reflected by the pilot signal. This frequency error can be attributable to any of a variety of causes, including, for example, frequency drift caused by temperature, aging, and other factors. Accordingly, to maintain reliable communication with the base station 104, the WCD 102 uses an automatic frequency control (AFC) technique to adjust the frequency of the oscillator to match substantially the frequency of the base station 104.

In various implementations, the AFC technique involves obtaining instantaneous estimates of the frequency error between the oscillator in the WCD 102 and the base station over several samples. These instantaneous estimates may be obtained using any of a variety of techniques that are well known to those of ordinary skill in the art. The instantaneous frequency error estimates are averaged over multiple integration lengths to obtain short-term and long-term average values of the estimated frequency error. The WCD 102 compares the short-term and long-term average values with short-term and long-term thresholds. The long-term threshold is lower than the short-term threshold because smaller changes in the frequency error are significant when they appear over a larger set of samples. If the average for any integration length exceeds its respective threshold, a frequency offset is determined and an oscillator frequency is adjusted based on that frequency offset. In addition, any change in the frequency error estimate may be significant if it appears over a still larger set of samples, and the WCD 102 may adjust the oscillator frequency by a frequency offset determined relative to this still larger set of samples.

By calculating both short-term and long-term average values and comparing them with short-term and long-term thresholds, the WCD 102 can respond quickly to relatively large changes in the frequency error. The WCD 102 can also disregard smaller changes that may be attributable to noise in the system rather than actual changes in the frequency error. Calculating long-term average values and comparing them with a long-term threshold lower than the short-term threshold facilitates responding to smaller changes in the frequency error. Requiring smaller changes to persist over a larger set of samples provides some protection against noise in the system, i.e., variations in the instantaneous frequency error estimate between successive samples that may not be representative of actual changes in the frequency error.

Figure 2:
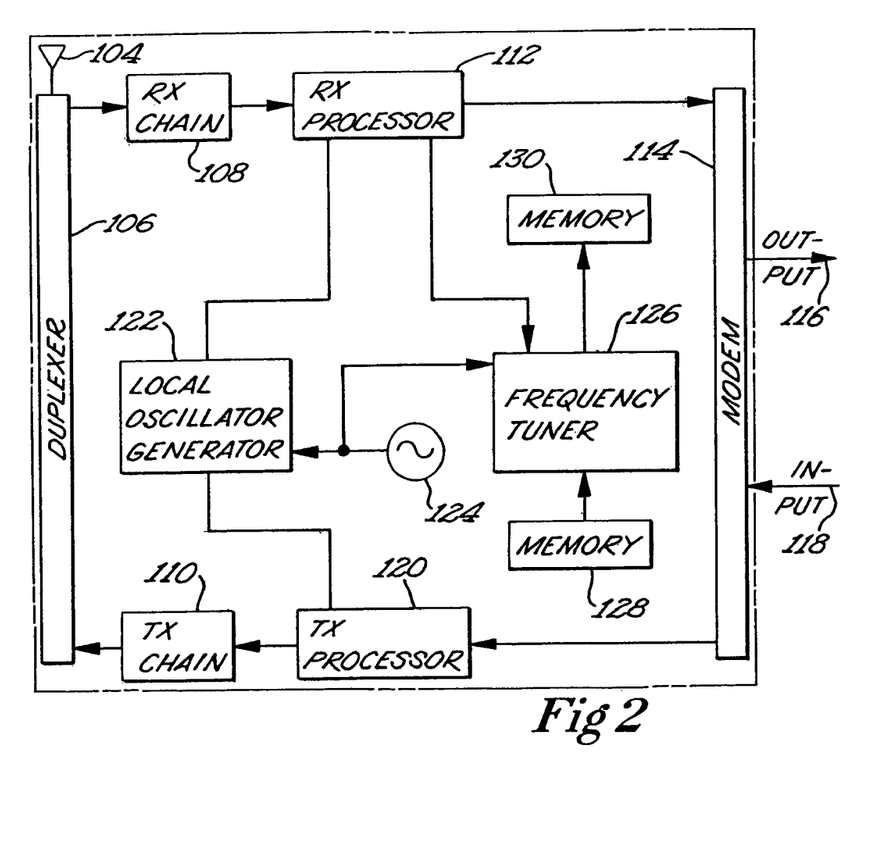
FIG. 2 is a block diagram illustrating an example wireless communication device according to another embodiment.

FIG. 2 is a block diagram illustrating an example wireless communication device (WCD) 102. While the WCD 102 is described as a wireless telephone communicating using the GSM protocol, it will be understood by those skilled in the art that the WCD 102 can be configured to communicate using any of a variety of wireless communication protocols, including, but not limited to, IS-95, CDMA2000, and WCDMA. It will be understood that one or more of the components depicted in FIG. 2 may be implemented as microprocessor-based circuits or formed as integrated circuits (ICs), such as application-specific integrated circuits (ASICs).

The WCD 102 transmits and receives signals via an antenna 104 operatively coupled to a duplexer 106. The duplexer 106 is operatively coupled to an input of a receive chain 108 and to an output of a transmit chain 110. Forming part of a receive signal path, the receive chain 108 may include a surface acoustic wave (SAW) filter and a low noise amplifier (LNA). Because the RF signal received by the duplexer 106 is of relatively low power compared to the baseband signals, the LNA amplifies the RF signal. A receive processor 112 then performs RF-to-baseband signal processing to produce baseband quadrature signals to be demodulated by the modem 114. In particular, the receive processor 112 downconverts the RF signal to in-phase (I) and quadrature (Q) baseband signals. The receive processor 112 may first downconvert the RF signal to an intermediate frequency (IF) before downconverting the RF signal to the baseband frequency. Alternatively, the receive processor 112 may downconvert the RF signal directly to the baseband frequency without first downconverting the RF signal to the intermediate frequency. In either case, the receive processor 112 provides the baseband signals to a modem 114, which demodulates the baseband signals to produce an output signal that is decoded by a decoder (not shown) and provided to an output device, e.g., a speaker or a display screen, conceptually represented by an output 116.

In a transmit signal path, a user of the WCD 102 provides input to the WCD 102 via an input device, such as a microphone or a keypad, conceptually represented by an input 118. An encoder (not shown) encodes the input and provides an encoded signal to the modem 114. The modem 114 uses quadrature phase shift keying (QPSK) to modulate the user input, for example, according to the GSM wireless communication protocol. In alternative embodiments, the modem 114 may modulate the user input according to a different wireless communication protocol, such as a CDMA protocol. As a result of the modulation process, the modem 114 generates in-phase (I) and quadrature (Q) baseband signals. A transmit processor 120 performs baseband-to-RF signal processing to produce an RF signal to be transmitted by the WCD 102. In particular, the transmit processor 120 upconverts the baseband quadrature signals to an RF signal in, for example, the GSM frequency band and amplifies the baseband quadrature signals to provide signal drive capability to the transmit chain 110. Additionally, the transmit processor 120 may upconvert the baseband quadrature signals to the DCS frequency band or any other band supporting GSM communications. The transmit processor 120 may first upconvert the baseband quadrature signals to an intermediate frequency (IF) before upconverting the signals to the RF frequency band. Alternatively, the transmit processor 120 may upconvert the baseband quadrature signals directly to the RF frequency band without first upconverting the baseband quadrature signals to the intermediate frequency. In either case, the transmit processor 120 provides the upconverted signals to the transmit chain 110. The transmit chain 110 incorporates a power amplifier to amplify the RF signal and may further incorporate one or more filtering elements. The transmit chain 110 provides the amplified signal to the duplexer 106. The duplexer 106 then provides the RF signal to the antenna 104, which transmits the RF signal.

A local oscillator generator 122 is coupled to the receive processor 112 and to the transmit processor 120. The local oscillator generator 122 is also coupled to an oscillator 124. The oscillator 124 can be implemented, for example, as a voltage-controlled crystal oscillator (VCXO) or a voltage-controlled, temperature-compensated crystal oscillator (VCTCXO). The local oscillator generator 122 and the oscillator 124 collectively facilitate accurate demodulation of received RF signals and modulation of RF signals to be transmitted. Typically, a base station broadcasts a signal on the frequency correction channel (FCCH) that is detectable by the receive chain 108. The receive processor 112 uses the FCCH in coarse frequency estimation to facilitate tuning of the oscillator 124 to an appropriate frequency via a frequency tuner 126. Similarly, the local oscillator generator 122 and the oscillator 124 collectively facilitate baseband-to-RF conversion by the transmit processor 120 via a reference frequency output from the local oscillator generator 122 and one or more frequency upconverters and mixers (not shown).

When the user activates the WCD 102, the initial frequency of the oscillator 124 may vary from the base station frequency. The amount by which the frequency of the oscillator 124 differs from that of the base station is known as the frequency error. This frequency error can be attributable to any of a variety of causes, including, for example, frequency drift caused by temperature, aging, and other factors. Accordingly, to maintain reliable communication with the base station, the frequency tuner 126 uses an automatic frequency control (AFC) technique to adjust the frequency of the oscillator to match substantially the frequency of the base station.

Frequency error is difficult to measure in real time due at least in part to potentially large variations in the frequency error estimate between even consecutive samples. Accordingly, the frequency tuner 126 estimates the frequency error and applies a frequency offset based on the estimated frequency error to the oscillator 124. As described more fully below in connection with FIG. 3, the frequency tuner estimates the frequency error as a function of averages of individual estimates of the frequency error over several samples. These individual estimates may be obtained using any of a variety of techniques that are well known to those of ordinary skill in the art, including, for example, estimating the frequency error as a function of a frequency error measurement for a previous sample.

When the WCD 102 is initially powered up, the frequency tuner 126 reads an initial frequency setting for the oscillator 124 from a memory 128. The memory 128 may be implemented, for example, as a nonvolatile memory. The frequency tuner 126 obtains individual frequency error estimates and averages them over multiple integration lengths to obtain short-term and long-term average values of the estimated frequency error. The frequency tuner 126 compares the short-term and long-term average values with short-term and long-term thresholds. The long-term threshold is lower than the short-term threshold because smaller changes in the frequency error are significant when they appear over a larger set of samples. If the average for any integration length exceeds its respective threshold, the frequency tuner 126 determines a frequency offset and adjusts an oscillator frequency based on that frequency offset. In addition, any change in the frequency error estimate may be significant if it appears over a still larger set of samples, and the frequency tuner 126 may adjust the oscillator frequency by a frequency offset determined relative to this still larger set of samples. During this process, the frequency tuner 126 may store the average estimated frequency error in a memory 130, such as a pulse density modulator (PDM) register. In some embodiments, the memory 130 and the memory 128 may be implemented using a single memory device.

By calculating both short-term and long-term average values and comparing them with short-term and long-term thresholds, the frequency tuner can respond quickly to relatively large changes in the frequency error. The frequency tuner 126 can also disregard smaller changes that may be attributable to noise in the system rather than actual changes in the frequency error. Calculating long-term average values and comparing them with a long-term threshold lower than the short-term threshold facilitates responding to smaller changes in the frequency error. Requiring smaller changes to persist over a larger set of samples provides some protection against noise in the system.

Figure 3:
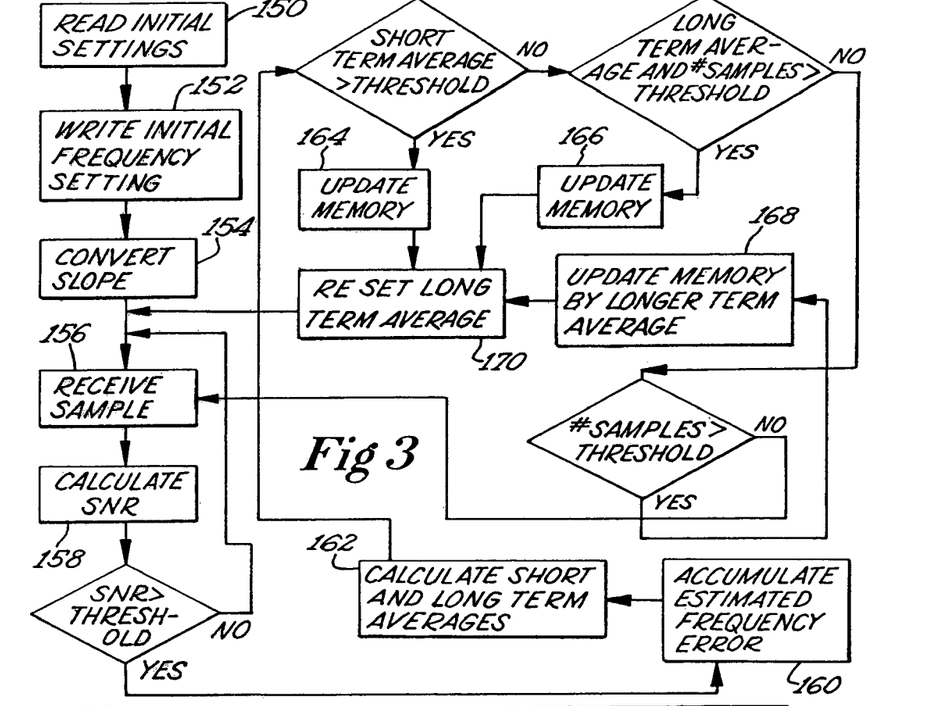
FIG. 3 is a flow diagram illustrating an example automatic frequency control (AFC) technique.

FIG. 3 is a flow diagram illustrating an example automatic frequency control (AFC) technique as implemented by the frequency tuner 126. This technique may be implemented via processor-executable instructions contained in a processor-readable medium, such as a memory device. When the WCD 102 is initially powered up, the frequency tuner 126 reads initial settings (150) for the oscillator 124 from the memory 128. These initial settings may include, for example, an initial frequency setting and a slope of the oscillator 124 in ppm/lsb, which can be factory-programmed. The initial frequency setting can also be factory-programmed, but is preferably periodically updated during operation. The frequency tuner 126 writes the initial frequency setting (152) to the memory 130 and converts the slope as expressed in ppm/lsb to an lsb/Hz value (154). This conversion can be calculated for the middle of the GSM band and the middle of the DCS band rather than for each absolute radio frequency channel number (ARFCN).

Throughout the AFC technique implemented by the frequency tuner 126, the frequency tuner 126 generates estimates of the frequency error and updates the memory 130. The AFC technique can be applied in any of a variety of modes, including, for example, detecting a frequency control channel (FCCH) and a synchronization channel (SCH), detecting a standalone dedicated control channel (SDCCH) or other control channel, and detecting a traffic channel (TCH). In all modes other than FCCH/SCH detection, the basic structure of the AFC technique is the same. More particularly, the frequency tuner 126 accumulates the estimate of the frequency error for a number of samples, periodically computes the average frequency error for those samples, determines a frequency offset based on the average frequency error, and applies any updates as necessary. If the frequency error is large, it is desirable to update the value stored in the memory 130 quickly. If the frequency error is small, on the other hand, longer averaging intervals or integration lengths are preferable to achieve accuracy.

After the initial frequency settings are read from the memory 128 and stored in the memory 130, the frequency tuner 126 receives a sample (156) from the receive processor 112 and calculates a signal-to-noise ratio (SNR) for the sample (158). If the SNR is below a minimum SNR threshold, the sample is ignored and the frequency tuner 126 receives another sample (156) from the receive processor 112. Alternatively, in some situations, the frequency tuner 126 may use all samples regardless of the SNR for synchronization purposes.

After the frequency tuner 126 has received a sample with an adequate SNR, the frequency tuner 126 estimates the frequency error for that sample and accumulates the estimated frequency error (160). Unless operating in the FCCH/SCH detection mode, the frequency tuner 126 preferably quantizes the frequency error estimates such that the frequency tuner 126 reports a value selected from a set of discrete values, for example, −200 Hz, −100 Hz, 0 Hz, 100 Hz, or 200 Hz. The frequency tuner 126 continues to receive and accumulate estimated frequency error values for a number of values specified by an integration length N, for example, four samples.

When the frequency tuner 126 has accumulated estimated frequency error values for N samples, the frequency tuner 126 calculates short-term and long-term averages of the estimated frequency error values (162). The short-term average is the average estimated frequency error calculated over the integration length of N samples. The long-term average is the average estimated frequency error calculated over a larger number of samples, for example, all samples received after a previous reset operation.

If the short-term average value exceeds a short-term threshold value, e.g., 175 Hz, the frequency tuner 126 updates the memory 130 by the short-term average value (164). Even if the short-term average value does not exceed the threshold value, the frequency tuner 126 may update the memory 130 under other circumstances. For instance, if the long-term average value exceeds a long-term threshold value that is lower than the short-term threshold value, e.g., 50 Hz, over a greater number of samples, e.g., twelve samples, the frequency tuner 126 updates the memory 130 by the long-term average value (166). In addition, the frequency tuner 126 may update the memory 130 by the long-term average value (168) over a still greater number of samples, e.g., 96 samples, regardless of the size of the long-term average value, i.e., with a long-term threshold value of zero. Any frequency error over this number of samples may be significant. Whenever the frequency tuner 126 updates the memory 130, the long-term average value is reset (170).

FIG. 3 illustrates comparing the short-term average value to a short-term threshold and comparing the long-term average value to a long-term threshold. It will be appreciated by those of ordinary skill in the art that the frequency tuner 126 may compare the long-term average value to multiple long-term thresholds over multiple integration lengths.

As described above, the AFC technique depicted in FIG. 3 can be applied in a variety of modes, including, but not limited to, detecting a standalone dedicated control channel (SDCCH) or other control channel during a broadcast control channel (BCCH) detection mode, an idle mode or a random access mode.

The AFC technique can also be applied to detect a dedicated traffic channel (TCH). In this mode, the frequency tuner 126 optionally considers only samples received on a standalone control channel (SACCH). By disregarding other samples, processor resources are conserved while ensuring adequate performance. If the frequency tuner 126 only considers SACCH samples, the AFC technique is enabled before every SACCH burst and disabled after every SACCH burst.

With some adaptation, the AFC technique can also be used in an FCCH/SCH detection mode. During FCCH/SCH detection, the modem 114 has direct control over frequency tracking. Accordingly, in this mode, the frequency tuner 126 communicates the initial frequency and slope settings to the modem 114. In addition, rather than quantizing the frequency error estimates as described above, the modem 114 computes the frequency error estimate as a relatively non-quantized value.

During FCCH/SCH detection, the modem compares the short-term or long-term average value with an FCCH frequency error threshold. If the average value exceeds the FCCH frequency error threshold, the modem 114 updates the memory 130 by the full amount of the average value. Otherwise, the modem 114 updates the memory 130 by half of the average value. Further, if the average value is less than an SCH frequency error threshold, the modem 114 attempts to decode the SCH channel. Otherwise, the modem 114 continues to scan for the FCCH channel and no frequency estimation or memory updates are performed based on SCH samples. When the SCH detection is successful, the modem 114 begins to decode the broadcast control channel (BCCH) and assumes control of AFC using the most recent frequency offset value as a starting point. This frequency offset value is then initialized to a default value stored, for example, in the memory 130.

Figure 4:
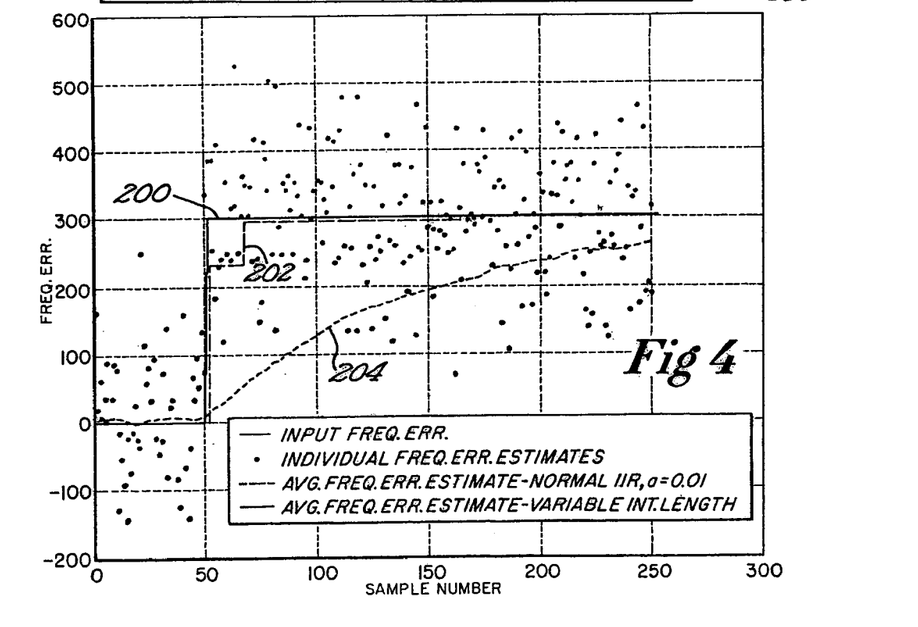
FIGS. 4–6 are graphs depicting simulated performance comparisons between the AFC technique of FIG. 3 and conventional AFC techniques using an infinite impulse response (IIR) filter.
Figure 5:
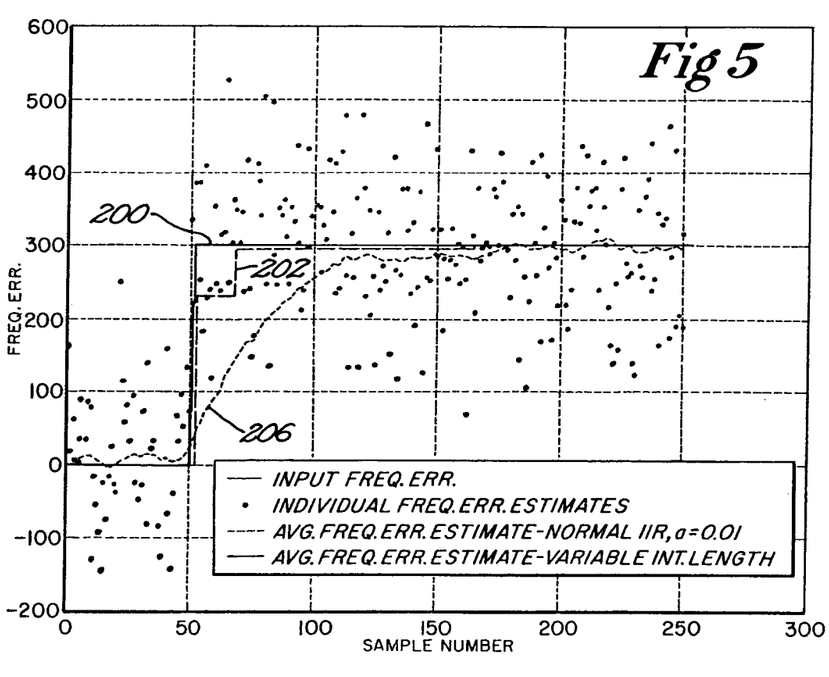
Figure 6:
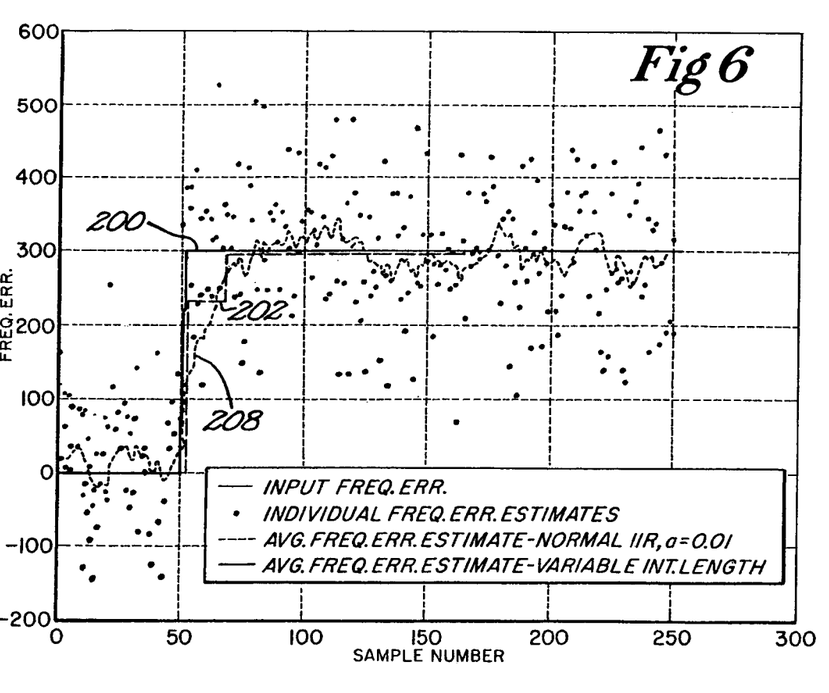

FIGS. 4–6 are graphs depicting simulated performance comparisons between the AFC technique illustrated in and described in connection with FIG. 3 and conventional AFC techniques using an infinite impulse response (IIR) filter. In FIGS. 4–6, dots indicate individual frequency error estimates calculated over 250 samples. A solid line 200 indicates a simulated frequency error of 300 Hz introduced at the 50th sample. A dashed line 202 indicates the result of applying the AFC technique of FIG. 3. Dotted lines 204, 206, and 208 indicate the result of applying a conventional AFC technique using an IIR filter with varying scale factors.

The dotted line 204 on FIG. 4 indicates the result of applying a conventional AFC technique using an IIR filter with a scale factor of 0.01. As shown in FIG. 4, the frequency error estimate responds slowly to the simulated frequency error. Increasing the scale factor to 0.03 produces the result shown by the dotted line 206 of FIG. 5. The WCD 102 responds more quickly to the simulated frequency error. However, the response is more susceptible to wide fluctuations between individual frequency error estimates, which represent noise in the system rather than the simulated frequency error. The dotted line 208 of FIG. 6 illustrates the effect of further increasing the scale factor to 0.10. In particular, as the scale factor is increased, the WCD 102 responds more quickly to the simulated frequency error, but the response is more susceptible to noise.

Figure 7:
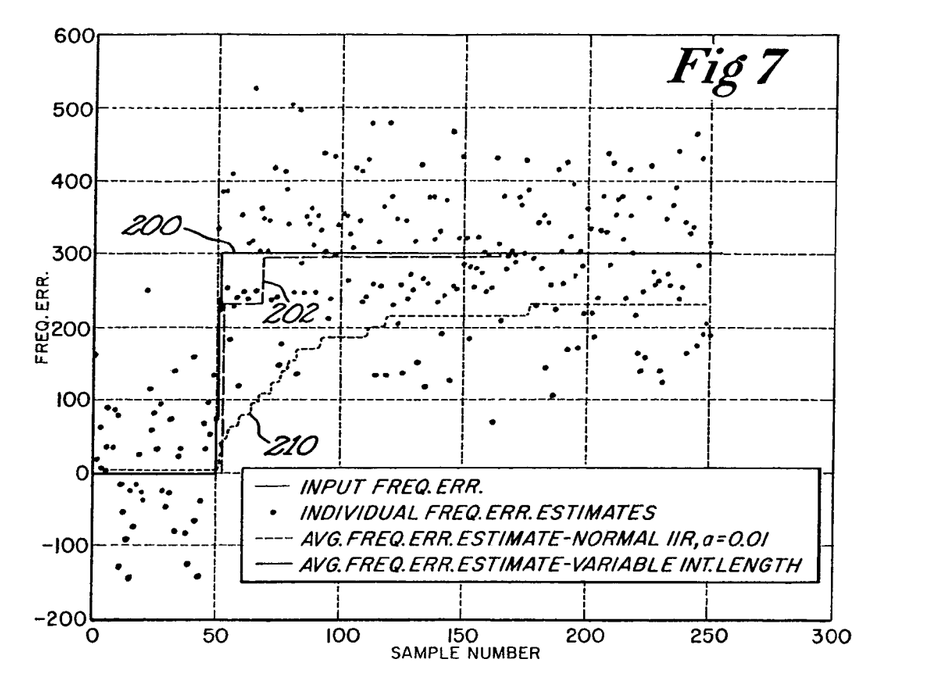
FIG. 7 is a graph depicting a simulated performance comparison between the AFC technique of FIG. 3 and a conventional AFC technique using a quantized IIR filter.

FIG. 7 is a graph depicting a simulated performance comparison between the AFC technique illustrated and described in FIG. 3 and a conventional AFC technique using a quantized IIR filter with a scale factor of 0.03. By comparison to the dotted line 206 of FIG. 5, a dotted line 210 illustrates reduced noise susceptibility, but slower response time to the simulated frequency error. It can be seen that the quantized IIR filter fails to converge on the 300 Hz simulated frequency error within 250 samples.

Figure 8:
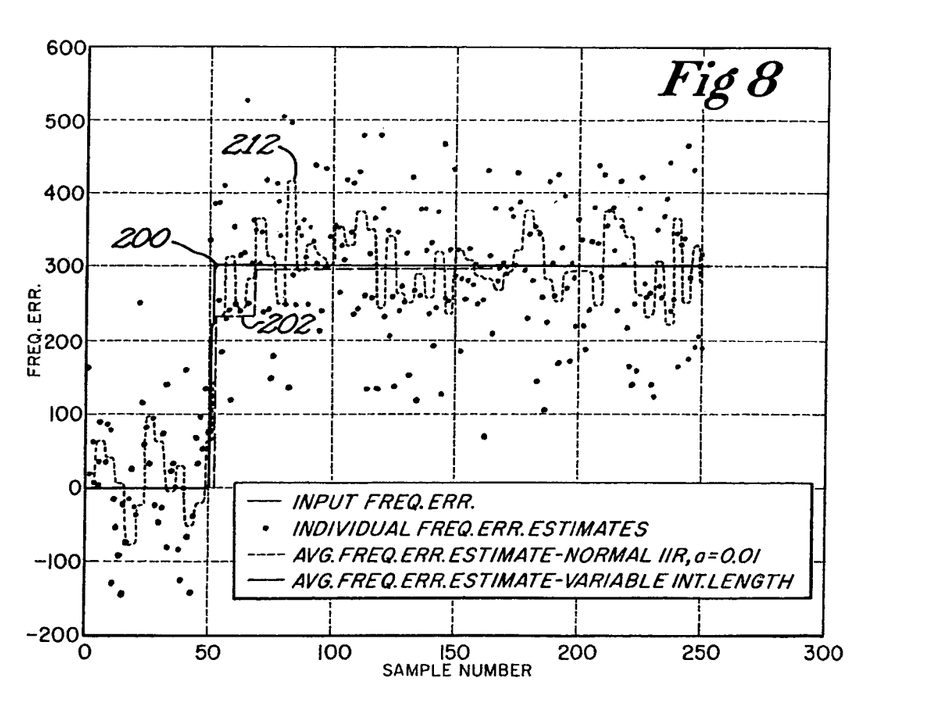
FIGS. 8–10 are graphs depicting simulated performance comparisons between the AFC technique of FIG. 3 and conventional AFC techniques using a single integration length.
Figure 9:
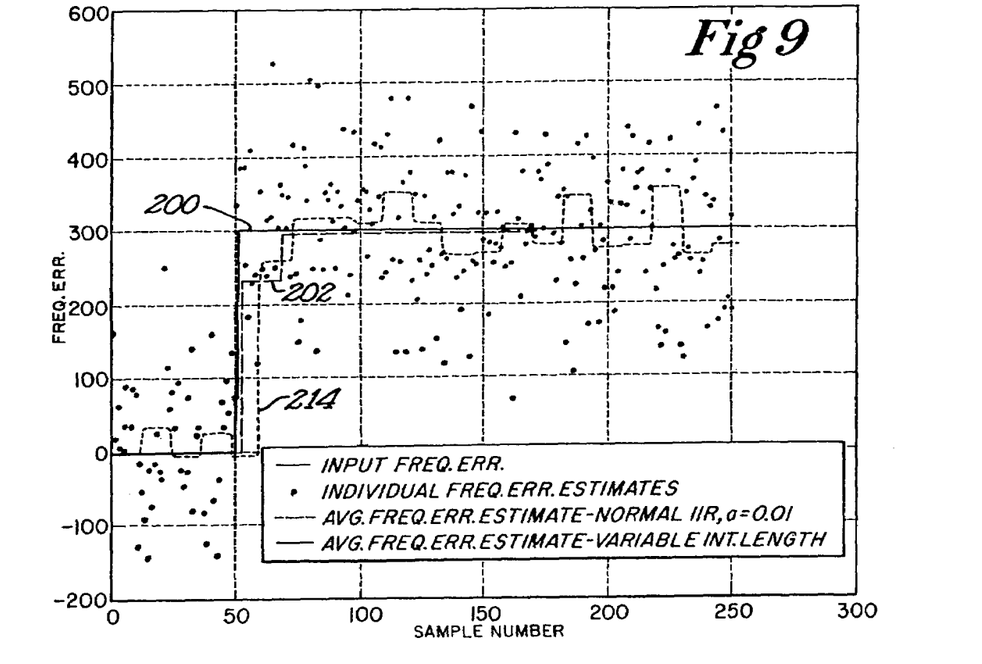
Figure 10:
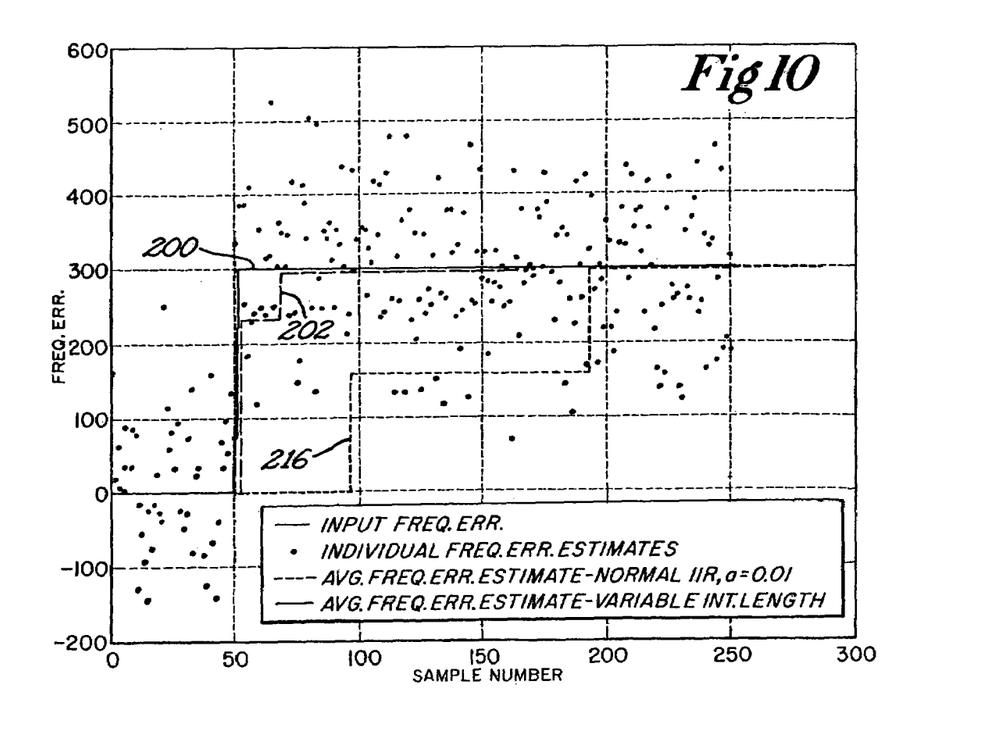

FIGS. 8–10 are graphs depicting simulated performance comparisons between the AFC technique illustrated in and described in connection with FIG. 3 and conventional AFC techniques using a single integration length. In FIGS. 8–10, dots indicate individual frequency error estimates calculated over 250 samples. A solid line 200 indicates a simulated frequency error of 300 Hz introduced at the 50th sample. A dashed line 202 indicates the result of applying the AFC technique of FIG. 3. Dotted lines 212, 214, and 216 indicate the result of applying a conventional AFC technique using a single integration length.

The dotted line 212 of FIG. 8 indicates the result of applying a conventional AFC technique using single integration length of four samples. As shown in FIG. 8, the WCD 102 responds quickly to the simulated frequency error, but is highly susceptible to noise. Increasing the integration length to twelve samples produces the result indicated by the dotted line 214 of FIG. 9. As shown in FIG. 9, the response is less susceptible to noise. However, the WCD 102 responds more slowly to the simulated frequency error. Further increasing the integration length to 96 samples produces the result indicated by the dotted line 216 of FIG. 10. The response is substantially unaffected by noise, but only converges on the simulated frequency error after nearly 200 samples.

By contrast, as shown by the dashed line 202 of FIGS. 4–10, the WCD 102 combines the advantages of using a small integration length and of using a large integration length by using multiple integration lengths. By generating both short-term and long-term average frequency error estimates, the WCD 102 can respond quickly to relatively large changes in the frequency error, while ignoring smaller changes that may be indicative of noise in the system rather than actual changes in the frequency error. In addition, calculating long-term average values and comparing them with a long-term threshold lower than the short-term threshold facilitates responding to smaller changes in the frequency error. Requiring smaller changes to persist over a larger set of samples provides some protection against noise in the system, i.e., variations in the instantaneous frequency error estimate between successive samples that may not be representative of actual changes in the frequency error.

The foregoing description of various embodiments is provided to enable any person skilled in the art to practice the present invention. Various modifications to these embodiments will be readily apparent to those skilled in the art, and the general principles described herein may be applied to other embodiments without the use of the inventive faculty. Accordingly, the present invention is not intended to be limited to the embodiments expressly described herein, but is to be accorded the widest scope consistent with the principles and novel features disclosed herein.

What is claimed is:

1. A method to determine a frequency offset to be applied in a wireless communication device, the method comprising:
   averaging a first set of frequency error estimates to determine a short-term average value;
   averaging a second set of frequency error estimates to determine a long-term average value, the second set comprising a superset of the first set of frequency error estimates;
   determining the frequency offset as a function of the short-term average value when the short-term average value exceeds a short-term threshold value; and
   determining the frequency offset as a function of the long-term average value when the long-term average value exceeds a long-term threshold value lower than the short-term threshold value.

2. The method of claim 1, further comprising:
   determining an average value of a third set of frequency error estimates, the third set comprising a superset of the second set of frequency error estimates; and
   determining the frequency offset as a function of the average value of the third set of frequency error estimates.

3. The method of claim 1, further comprising adjusting an oscillator frequency as a function of the frequency offset.

4. The method of claim 3, wherein adjusting the oscillator frequency comprises writing the frequency offset to a memory associated with an oscillator.

5. The method of claim 1, wherein:
   the wireless communication device is configured to detect a frequency control channel (FCCH); and
   determining the frequency offset comprises
      using one of the short-term average value and the long-term average value as the frequency offset when the one of the short-term average value and the long-term average value exceeds an FCCH error threshold, and
      using a value equal to half of the one of the short-term average value and the long-term average value as the frequency offset when the one of the short-term average value and the long-term average value does not exceed the FCCH error threshold.

6. The method of claim 5, further comprising decoding a synchronization channel (SCH) when the one of the short-term average value and the long-term average value is less than an SCH error threshold.

7. The method of claim 1, further comprising decoding at least one of a control channel and a traffic channel.

8. A method to configure an oscillator for use in connection with a wireless communication device, the method comprising:
reading a frequency offset value from a memory associated with the oscillator;
averaging a first set of frequency error estimates to determine a short-term average value;
averaging a second set of frequency error estimates to determine a long-term average value, the second set comprising a superset of the first set of frequency error estimates;
adjusting an oscillator frequency as a function of the short-term average value when the short-term average value exceeds a short-term threshold value; and
adjusting the oscillator frequency as a function of the long-term average value when the long-term average value exceeds a long-term threshold value lower than the short-term threshold value.

9. The method of claim 8, further comprising:
determining an average value of a third set of frequency error estimates, the third set comprising a superset of the second set of frequency error estimates; and
adjusting the oscillator frequency as a function of the average value of the third set of frequency error estimates.

10. The method of claim 8, wherein adjusting the oscillator frequency comprises writing the frequency offset to a memory associated with an oscillator.

11. An integrated circuit (IC) comprising:
an oscillator; and
a processor arrangement operatively coupled to the oscillator and configured to
average a first set of frequency error estimates to determine a short-term average value,
average a second set of frequency error estimates to determine a long-term average value, the second set comprising a superset of the first set of frequency error estimates,
adjust a frequency of the oscillator as a function of the short-term average value when the short-term average value exceeds a short-term threshold value, and
adjust a frequency of the oscillator as a function of the long-term average value when the long-term average value exceeds a long-term threshold value lower than the short-term threshold value.

12. The IC of claim 11, wherein the processor arrangement is further configured to:
determine an average value of a third set of frequency error estimates, the third set comprising a superset of the second set of frequency error estimates; and
adjust the frequency of the oscillator as a function of the average value of the third set of frequency error estimates.

13. The IC of claim 11, further comprising a memory operatively coupled to the processor arrangement and configured to store a frequency offset to adjust the frequency of the oscillator.

14. The IC of claim 13, wherein the memory comprises a nonvolatile memory.

15. The IC of claim 11, wherein the processor arrangement is configured to:
detect a frequency control channel (FCCH);
adjust the frequency of the oscillator by one of the short-term average value and the long-term average value when the one of the short-term average value and the long-term average value exceeds an FCCH error threshold; and
adjust the frequency of the oscillator by half of the one of the short-term average value and the long-term average value when the one of the short-term average value and the long-term average value does not exceed the FCCH error threshold.

16. The IC of claim 15, wherein the processor arrangement is configured to decode a synchronization channel (SCH) when the one of the short-term average value and the long-term average value is less than an SCH error threshold.

17. The IC of claim 11, wherein the processor arrangement is configured to decode at least one of a control channel and a traffic channel.

18. A wireless communication device (WCD) comprising:
an antenna arranged to receive an RF signal;
a receive arrangement, operatively coupled to the antenna, to generate a plurality of samples as a function of the RF signal;
an oscillator, operatively coupled to the receive arrangement and configured to generate a frequency; and
a processor arrangement, coupled to receive the plurality of samples from the receive arrangement and configured to
calculate a plurality of frequency error estimates as a function of the samples;
average a first subset of the frequency error estimates to determine a short-term average value,
average a second subset of the frequency error estimates to determine a long-term average value, the second subset comprising a superset of the first subset of frequency error estimates,
adjust the frequency generated by the oscillator as a function of the short-term average value when the short-term average value exceeds a short-term threshold value, and
adjust the frequency generated by the oscillator as a function of the long-term average value when the long-term average value exceeds a long-term threshold value lower than the short-term threshold value.

19. The WCD of claim 18, wherein the processor arrangement is further configured to:
determine an average value of a third set of frequency error estimates, the third set comprising a superset of the second set of frequency error estimates; and
adjust the frequency generated by the oscillator as a function of the average value of the third set of frequency error estimates.

20. The WCD of claim 18, further comprising a memory operatively coupled to the processor arrangement and configured to store a frequency offset to adjust the frequency of the oscillator.

21. The WCD of claim 20, wherein the memory comprises a nonvolatile memory.

22. The WCD of claim 18, wherein the processor arrangement is configured to:
detect a frequency control channel (FCCH);
adjust the frequency of the oscillator by one of the short-term average value and the long-term average value when the one of the short-term average value and the long-term average value exceeds an FCCH error threshold; and adjust the frequency of the oscillator by half of the one of the short-term average value and the long-term average value when the one of the short-term average value and the long-term average value does not exceed the FCCH error threshold.

23. The WCD of claim 22, wherein the processor arrangement is configured to decode a synchronization channel (SCH) when the one of the short-term average value and the long-term average value is less than an SCH error threshold.

24. The WCD of claim 18, wherein the processor arrangement is configured to decode at least one of a control channel and a traffic channel.

25. A processor arrangement comprising:
   means for averaging a first set of frequency error estimates to determine a short-term average value;
   means for averaging a second set of frequency error estimates to determine a long-term average value, the second set comprising a superset of the first set of frequency error estimates;
   means for adjusting a frequency of the oscillator as a function of the short-term average value when the short-term average value exceeds a short-term threshold value; and
   means for adjusting a frequency of the oscillator as a function of the long-term average value when the long-term average value exceeds a long-term threshold value lower than the short-term threshold value.

26. A processor-readable medium containing processor-executable instructions for:
   averaging a first set of frequency error estimates to determine a short-term average value;
   averaging a second set of frequency error estimates to determine a long-term average value, the second set comprising a superset of the first set of frequency error estimates;
   determining a frequency offset as a function of the short-term average value when the short-term average value exceeds a short-term threshold value; and
   determining a frequency offset as a function of the long-term average value when the long-term average value exceeds a long-term threshold value lower than the short-term threshold value.

27. The processor-readable medium of claim 26, containing further processor-executable instructions for:
   determining an average value of a third set of frequency error estimates, the third set comprising a superset of the second set of frequency error estimates; and
   determining the frequency offset as a function of the average value of the third set of frequency error estimates.

28. The processor-readable medium of claim 26, containing further processor-executable instructions for adjusting an oscillator frequency as a function of the frequency offset.

29. The processor-readable medium of claim 28, containing further processor-executable instructions for writing the frequency offset to a memory associated with an oscillator.

30. The processor-readable medium of claim 26, containing further processor-executable instructions for:
   detecting a frequency control channel (FCCH);
   using one of the short-term average value and the long-term average value as the frequency offset when the one of the short-term average value and the long-term average value exceeds an FCCH error threshold; and
   using a value equal to half of the one of the short-term average value and the long-term average value as the frequency offset when the one of the short-term average value and the long-term average value does not exceed the FCCH error threshold.

31. The processor-readable medium of claim 30, containing further processor-executable instructions for decoding a synchronization channel (SCH) when the one of the short-term average value and the long-term average value is less than an SCH error threshold.

32. The processor-readable medium of claim 26, containing further processor-executable instructions for decoding at least one of a control channel and a traffic channel.

33. A processor-readable medium containing processor-executable instructions for:
   reading a frequency offset value from a memory associated with an oscillator;
   averaging a first set of frequency error estimates to determine a short-term average value;
   averaging a second set of frequency error estimates to determine a long-term average value, the second set comprising a superset of the first set of frequency error estimates;
   adjusting an oscillator frequency as a function of the short-term average value when the short-term average value exceeds a short-term threshold value; and
   adjusting the oscillator frequency as a function of the long-term average value when the long-term average value exceeds a long-term threshold value lower than the short-term threshold value.

34. The processor-readable medium of claim 33, containing further processor-executable instructions for:
   determining an average value of a third set of frequency error estimates, the third set comprising a superset of the second set of frequency error estimates; and
   adjusting the oscillator frequency as a function of the average value of the third set of frequency error estimates.

35. The processor-readable medium of claim 33, containing further processor-executable instructions for writing the frequency offset to a memory associated with an oscillator.

* * * * *